United States Patent [19]

Bucher

[11] Patent Number: 5,621,737
[45] Date of Patent: Apr. 15, 1997

[54] COMMUNICATION SYSTEM WITH LINK MARGIN CONTROL AND METHOD

[75] Inventor: William A. Bucher, Tempe, Ariz.

[73] Assignee: Motorola, Inc., Schaumburg, Ill.

[21] Appl. No.: 276,728

[22] Filed: Jul. 18, 1994

[51] Int. Cl.⁶ .................................................. G06F 11/00
[52] U.S. Cl. ................................................ 371/5.1; 371/5.5
[58] Field of Search .................................. 371/5.1, 5.5, 5.3, 371/5.4; 375/224, 236

[56] References Cited

U.S. PATENT DOCUMENTS

| | | | |
|---|---|---|---|
| 4,545,018 | 10/1985 | Clements et al. | 364/474 |
| 4,654,854 | 3/1987 | Heppe | 371/43 |
| 4,920,537 | 4/1990 | Darling et al. | 371/5.1 |
| 4,928,288 | 5/1990 | D'Aria et al. | 375/17 |
| 5,036,515 | 7/1991 | Freeburg | 371/5.5 |
| 5,097,507 | 3/1992 | Zinser et al. | 381/31 |
| 5,126,686 | 6/1992 | Tam | 330/134 |
| 5,185,764 | 2/1993 | Baier | 375/13 |
| 5,233,628 | 8/1993 | Rappaport et al. | 375/10 |
| 5,249,205 | 9/1993 | Chennakeshu et al. | 375/101 |

*Primary Examiner*—Robert W. Beausoliel, Jr.
*Assistant Examiner*—Phung My Chung
*Attorney, Agent, or Firm*—Frederick M. Fliegel

[57] ABSTRACT

In a communication system (10), a receiving node (14) estimates bit error rate (BER) and the accuracy of the BER estimate based upon a single burst of a data communication signal (12). An appropriate decision rule (92) is selected (90) in response to the BER accuracy estimate. Different decision rules (92) are available to bias different decisions to favor desired outcomes. The bias is configured in response to the BER accuracy estimate. The selected decision rule (92) is evaluated (96) in view of an estimated BER. In response to this evaluation, a transmitting node (14) may be instructed (104) to increase or decrease its transmit power level. In addition, the BER may be measured, and the measurement used to verify the appropriateness of the decision rules (92).

18 Claims, 6 Drawing Sheets

COMMUNICATION SYSTEM WITH LINK MARGIN CONTROL AND METHOD

TECHNICAL FIELD OF INVENTION

The present invention relates generally to data communication systems which adaptively control transmission power to achieve a desired link margin.

BACKGROUND OF THE INVENTION

Communication systems often balance transmitted signal quality against a risk of interference. The best possible signal quality is desirable because a high quality signal best insures that communicated information will be accurately received. Many factors influence signal quality at a receiver. These factors include transmission power level, transmitter and receiver antenna design and orientation, distance between transmitter and receiver, environmental conditions, background noise or interference, and the like. However, if all other factors are equal, a higher transmission power level usually leads to a better quality signal, and a communication system typically uses as high a transmission power level as possible to achieve good signal quality at a receiver.

Conversely, many communication systems simultaneously attempt to minimize the transmission power level. In battery operated systems, the minimization of transmission power conserves battery reserves. In addition, regulations and/or frequency reuse schemes dictate the use of lower power levels to prevent interference with other communications taking place far away from the transmitter and receiver over the same spectrum.

Thus, communication systems control power levels to accomplish the conflicting goals of good signal quality and no interference. To satisfy these conflicting goals, many communication systems need to keep transmission power levels just high enough so that an adequate signal quality is maintained at a receiver, but no higher. However, the factors which influence signal quality can change on a moment by moment basis. For example, movement between transmitter and receiver, rain, interference, and other factors may all quickly alter signal quality. Thus, many communication systems need to adjust transmission power levels on a moment by moment basis to compensate for the other factors that influence signal quality.

In conventional digital communication systems, a bit error rate (BER) parameter has been used to provide an indication of received signal quality. Thus, the BER parameter, if communicated to a transmitter, might potentially be useful in controlling transmission power levels. BER may be measured by communicating error detection and correction codes along with normal data and by keeping a count of the errors found through implementation of an error correction scheme. However, this measurement technique often requires the transmission of tens of thousands of symbols before reliable BER measurements are available. In communication systems where data are occasionally transmitted in bursts, a great length of time may transpire before a reliable BER measurement can be obtained. This great length of time makes the measurement technique too unresponsive for use in controlling transmission power on a moment by moment basis.

Other conventional communication systems estimate BER more quickly than it may be measured through monitoring error corrections. Conventionally, BER may be estimated by integrating a noise function over a constant period of time, frame, or number of symbols, or by integrating the noise function over a variable number of symbols and dividing an accumulated integration value by the number of symbols over which it has been integrated. The use of constant periods is a particularly undesirable solution when data are transmitted in bursts of varying length. In such situations, the constant integration period is limited to the worst case, shortest available period, and the shortest integration period yields the least accurate BER estimate. The technique of dividing an accumulated integration value by the number of symbols integrated is also undesirable. Division operations are typically complex operations which are implemented at great expense. In addition, the BER estimate so determined varies in accuracy.

SUMMARY OF THE INVENTION

Accordingly, it is an advantage of the present invention that an improved system and method for link margin control are provided.

Another advantage is that the present invention controls transmission power levels in response to a parameter that characterizes the accuracy of a bit error rate estimator.

Another advantage is that the present invention controls transmission power levels in a data communication system on a burst by burst basis.

Another advantage is that the present invention accommodates variable burst lengths.

Another advantage is that the present invention applies a particular transmission power level control decision rule which is appropriate for the accuracy of the current bit error rate estimator.

Another advantage is that the present invention measures bit error rate to evaluate the appropriateness of transmission power level control decision rules.

The above and other advantages of the present invention are carried out in one form by a method of managing a link margin for a data communication signal transmitted at a power level. The method calls for determining a first parameter which corresponds to a bit error rate estimate. A second parameter is detected. The second parameter characterizes the accuracy of the first parameter. The power level is controlled in response to the first and second parameters.

BRIEF DESCRIPTION OF THE DRAWING

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
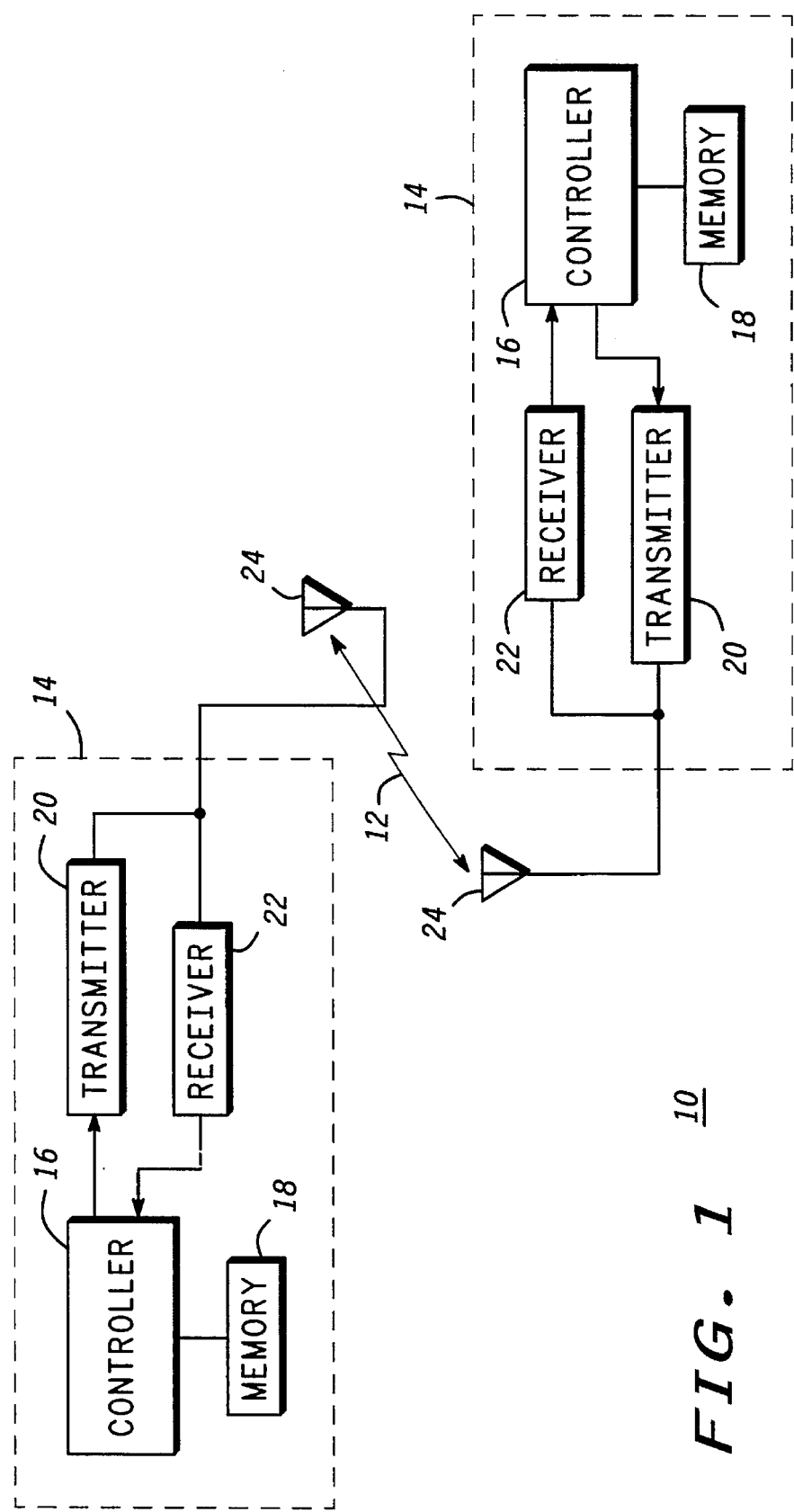
FIG. 1 is a block diagram of a communication system which may practice the present invention.

FIG. 1 is a block diagram of communication system 10. In the preferred embodiment, system 10 represents a data communication system in which digital data communication signals 12 are communicated between first and second radio nodes 14. FIG. 1 illustrates nodes 14 as being configured similarly to one another for the purposes of the present invention. However, nodes 14 need not be identical to one another, e.g., one node may be configured for placement on a satellite while another may be configured for placement on the ground. Alternatively, one node may be configured for placement in mobile or portable battery-operated equipment while the other may be configured as stationary equipment which has plenty of power available from a power distribution network.

Each node 14 includes controller 16 that couples to memory 18. Controller 16 is a microprocessor or other programmable control device controlled by programming instructions placed in associated memory 18. Memory 18 additionally stores tables, lists, databases and/or variables manipulated during the normal operation of nodes 14. Controller 16 couples to transmitter 20 and receiver 22, each of which couple to antenna 24. Controller 16 provides data controlling operation of transmitter 20 and receiver 22, including commands to program or adjust power levels at which transmitter 20 transmits data communication signals 12 and such data may include channel tuning instructions. Controller 16 additionally provides data that are transmitted away from node 14 and evaluates data that are received at node 14.

Although not shown, nodes 14 may include additional equipment not directly related to the present invention, e.g., nodes 14 may include vocoders, speakers and microphones so that they operate as voice communication terminals or nodes 14 may include additional transmitters 20 and receivers 22 so that they serve as communication network switches relaying data received at one receiver port to another transmitter port.

Figure 2:
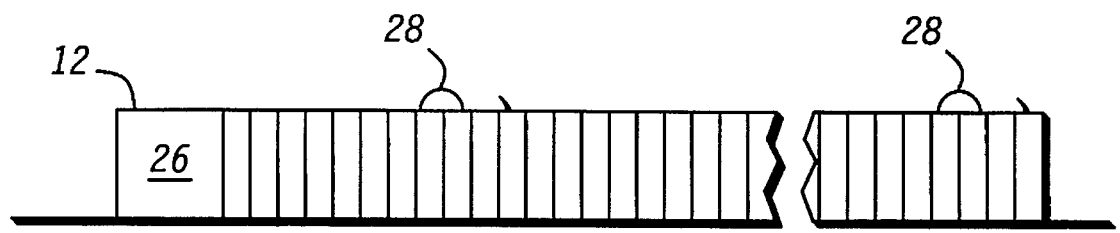
FIG. 2 is a data format diagram of a communication signal burst.

FIG. 2 is an exemplary data format diagram of communication signal 12. In the preferred embodiment, signal 12 represents a burst, rather than a continuous signal, and is referred to as burst 12 below. The duration of burst 12 may vary over time. Data may be conveyed through relative phase relationships between I and Q quadrature components of signal or burst 12 using any of many well known data modulation techniques.

Preamble portion 26 of burst 12 conveys data that help receiver 22 (FIG. 1) synchronize itself to the data modulation. Following preamble 26, any number of symbols 28 convey any amount of data. Those skilled in the art will appreciate that symbol 28 represents a discrete duration in which a predetermined number of bits of data are conveyed, e.g., for quadrature phase shift keyed (QPSK) modulation, two bits of data are conveyed during each symbol 28. The number of symbols 28 in a burst 12 may vary from burst 12 to burst 12.

Data conveyed by burst 12 in symbols 28 preferably includes error detection and correction codes, whether through convolutional encoding or otherwise. Such error detection codes may be decoded in receiver 22 to correct errors occurring by the time burst 12 is demodulated.

Figure 3:
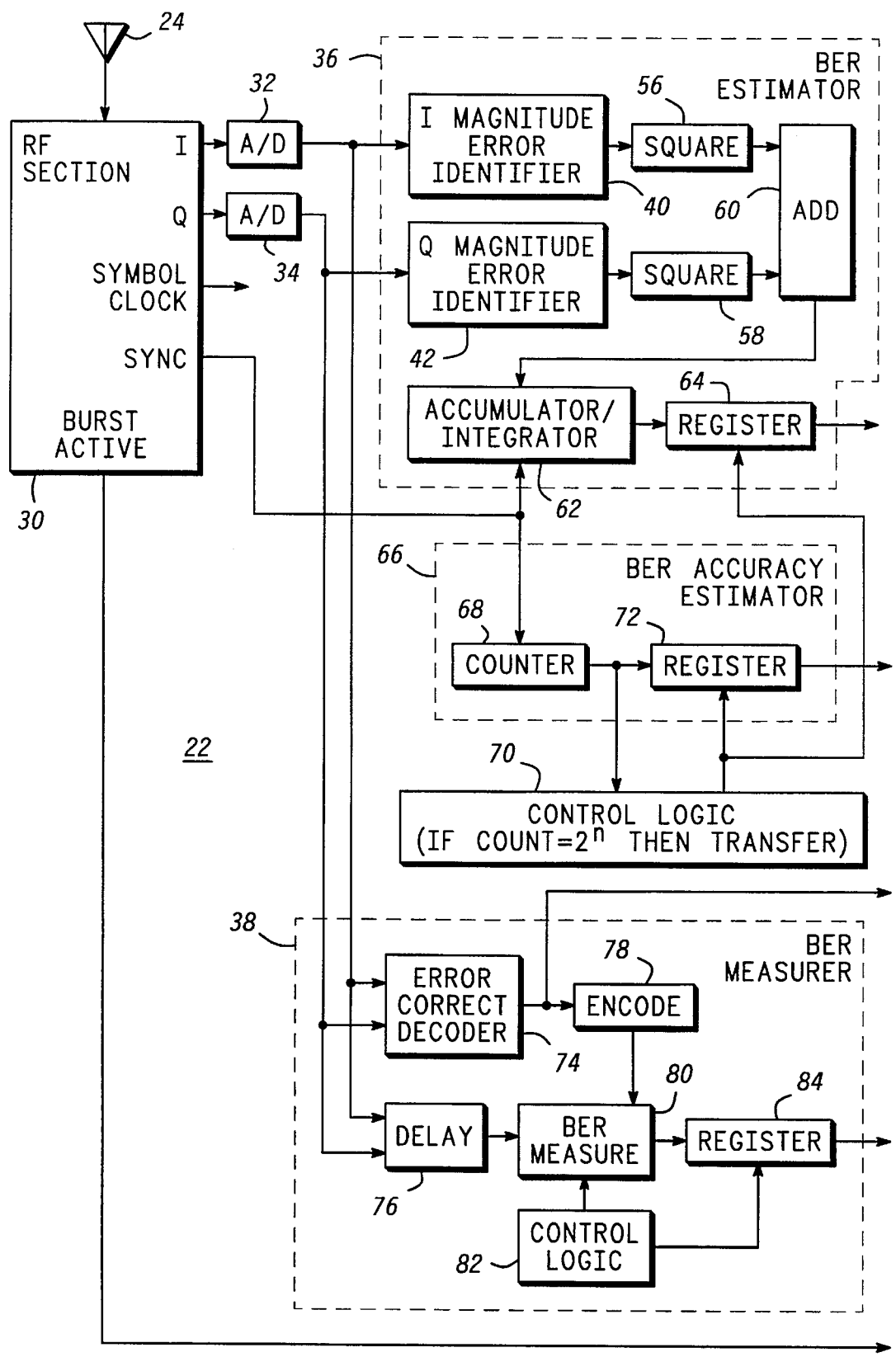
FIG. 3 is a block diagram of a receiver used in a preferred embodiment of the present invention.

FIG. 3 is a block diagram of receiver 22 for either of nodes 14 (FIG. 1). Signal burst 12 (FIGS. 1–2) is received at antenna 24. Antenna 24 couples to RF section 30. RF section 30 uses conventional techniques to demodulate signal 12 to baseband and to achieve both carrier and bit synchronization. Quadrature components of the baseband form of signal 12 are generated by RF section 30 at outputs I, Q. A symbol clock output provides a timing signal that tracks symbols 28 (FIG. 2). A synchronization signal activates when RF section 30 has synchronized to burst 12, and a burst active signal activates when burst 12 is detected.

FIG. 3 omits connections for the symbol clock signal generated by RF section 30 because the symbol clock drives substantially all circuits in receiver 22 in a manner which will be easily understood by those skilled in the art.

Output I of RF section 30 couples to analog-to-digital converter (A/D) 32, and Q output of RF section 30 couples to A/D 34. A/D's 32, 34 digitize the I, Q signals so that one I sample and one Q sample are available for each symbol 28. Outputs of A/D's 32, 34 couple to bit error rate (BER) estimator 36 and to BER measurer 38.

BER estimator 36 generally determines a value responsive to error magnitudes occurring over several symbols 28. This value corresponds to a BER estimate that need not precisely equal BER. As discussed in more detail below, a decision rule table may be programmed to compensate for various mathematical relationships which may exist between this value and an actual BER estimate. Thus, the implementation of BER estimator 36 may be simplified by not requiring generation of a number precisely equal to a BER estimate. It will be appreciated that errors may be phase errors, magnitude errors or a combination of both and that a phase error may be detected as a magnitude and vice versa. As used herein, errors are referred to as magnitude errors with the understanding that the term "magnitude error" may also include or be phase errors.

I, Q samples from A/D's 32, 34 are fed to magnitude error identifiers 40, 42, respectively, of BER estimator 36. Each of magnitude error identifiers 40, 42 determines the difference between the received quadrature component and a theoretical ideal.

Figure 4:
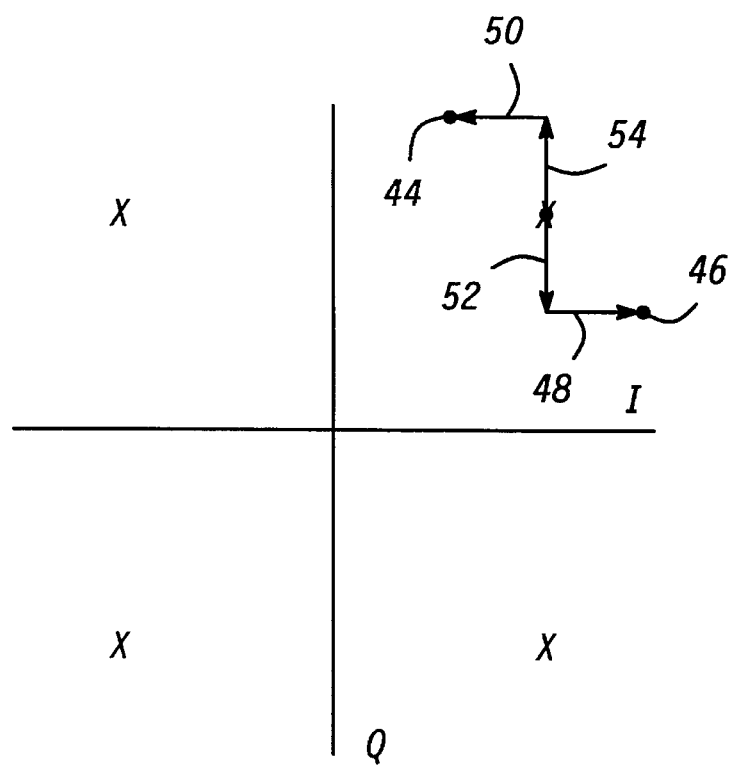
FIG. 4 is a phase constellation diagram.

FIG. 4 is a phase constellation diagram illustrating operation of magnitude error identifiers 40, 42. FIG. 4 shows a QPSK phase constellation for the purposes of illustration, however, the present invention is not limited to that single modulation technique. Theoretical ideal phase relationships between I, Q components are illustrated at "X's" in FIG. 4 and represent phase relationships which would be detected at receiver 22 for four different data states if no noise, error or other inaccuracy were introduced before or during demodulation. However, noise, error and other inaccuracies are invariably introduced into actual signals, and the detected phase at receiver 22 typically does not match a theoretical ideal relationship. Examples of two such actual phase relationships 44, 46 are illustrated by dots in FIG. 4. Of course, only one phase relationship occurs during any one symbol 28 (FIG. 2), and relationships 44, 46 depict examples from two arbitrary symbols 28.

I component magnitude error identifier 40 (FIG. 3) generates a value representing the I component of the difference between an actual phase relationship 46 or 44 and the closest theoretical ideal relationship. FIG. 4 depicts this difference or error through vectors 48, 50. Likewise, Q component magnitude error identifier 42 (FIG. 3) generates a value representing the Q component of the difference between an actual phase relationship 44 or 46 and the closest theoretical ideal relationship. FIG. 4 depicts this difference or error through vectors 52, 54. As illustrated in FIG. 4, the magnitude errors are signed quantities that may exhibit positive or negative values.

Referring back to FIG. 3, the signed magnitude errors from error identifiers 40, 42 are passed to magnitude circuits, such as squaring circuits 56, 58, respectively. One I and one Q error are provided for each symbol 28. Squaring circuits 56, 58 translate the signed error values into unsigned magnitude values through a mathematical squaring operation. However, alternative embodiments may use other magnitude operations, e.g., absolute value. For each symbol, the I magnitude value generated by I squaring circuit 56 is added to the Q magnitude value generated by Q squaring circuit 58 in an adder 60. Thus, for each symbol 28, adder 60 produces a value describing total or combined error magnitude.

Adder 60 couples to accumulator or integrator 62, which accumulates error magnitudes over the duration of burst 12 (FIG. 2). In other words, the error magnitudes for desirably each symbol 28 in burst 12, or at least as large a number of symbols 28 as is practical, are added together. The error magnitudes are added to one another so that a resulting accumulation value represents total error magnitude occurring over a number of symbols 28. An output of accumulator 62 couples to a register 64, and the accumulation value is transferred to register 64 from time to time. Controller 16 (FIG. 1) may obtain the accumulation value by reading register 64. This accumulation value corresponds to a BER estimate. As discussed below, controller 16 evaluates the accumulation value and a selected decision rule to make a decision regarding whether the power level at which signal 12 was transmitted should increase, decrease or remain the same.

BER accuracy estimator 66 generates a number characterizing the BER estimate accuracy provided by BER estimator 36. Synchronization signal output SYNC from RF section 30 couples to counter 68 of BER accuracy estimator 66 and to accumulator 62 of BER estimator 36. The synchronization signal is configured to reset counter 68 and accumulator 62 whenever receiver 22 is not synchronized to burst 12. Thus, when synchronization occurs, accumulator 62 and counter 68 each hold an initial value, e.g., zero. Counter 68 counts symbols 28 for which error magnitudes are being accumulated or integrated in accumulator 62. An output from counter 68 provides a count value identifying the number of symbols 28 included so far in the integration of accumulator 62. This output couples to control logic section 70 and to register 72.

Control logic section 70 generates a timing signal that determines when the count value generated by counter 68 and the accumulation value generated by accumulator 62 are transferred to registers 72, 64, respectively. Desirably, both values are transferred at the same instant. Control logic section 70 monitors counter 68 to determine when the symbol count reaches a value of $2^N$, where N represents any integer number within a predetermined set of integer numbers. Thus, for N=7, 8, ... 12, control logic section 70 transfers to registers 72, 64 at symbol counts of 128, 256, ... 4096, respectively. In an alternate embodiment, the value N may be loaded into register 72 rather than the actual count $2^N$.

When a transfer is made to registers 72, 64, old values stored therein are overwritten. Thus, registers 72, 64 are updated from time to time as receiver 22 receives more and more symbols 28. The BER estimate provided by BER estimator 36 more accurately describes actual BER as the number of symbols 28 over which the BER estimate is made grows. Thus, the output from register 72, which may be read by controller 16 (FIG. 1), characterizes BER estimate accuracy. As more and more symbols 28 in burst 12 are received, this accuracy improves. When controller 16 reads the BER estimate and associated accuracy parameter, the most accurate estimate available from integrating over an integral power of two number of symbols is provided along with an accuracy value quantifying that accuracy. This accuracy value need not equal a precise tolerance value. Rather, this value need only reflect a correlation with the actual accuracy. A decision rule table may be programmed to compensate for various mathematical relationships that may exist between this accuracy value and the accuracy of an actual BER estimate. Thus, implementation of BER accuracy estimator 66 may be simplified by not requiring generation of a number precisely equaling a BER accuracy estimate.

BER measurer 38 generates data conveyed by data communication signal 12 and measures actual BER. While BER measurer 38 measures actual BER, it need not provide precisely accurate BER values. Rather, BER measurer 38 provides a reasonably accurate measure of BER using a different technique from that used in BER estimator 36. Measured BER is used to verify that proper decision rules are being applied to estimated BER values.

I, Q phase values provided by A/D's 32, 34 drive error correcting decoder 74 and delay circuit 76. Decoder 74 evaluates error detection codes included in burst 12 and performs error correction in response thereto. The output of decoder 74 provides communicated data to controller 16 (FIG. 1) and couples to encoder 78. Encoder 78 performs an error detection encoding operation complementary to the decoding operation performed in decoder 74. This operation is similar to the error detection encoding performed in transmitter 20 (FIG. 1). The decoding and encoding operations may take several symbols 28 to complete. Delay circuit 76 inserts a delay equivalent to this number of symbols 28 so that data exits delay circuit 76 at the same time that corresponding data exits encoder 78.

Delay circuit 76 and encoder 78 each couple to BER measuring circuit 80, which compares the two data streams. So long as data generated by decoder 74 precisely equals data transmitted by transmitter 20 (FIG. 1), the two data streams will be the same. However, if the two data streams diverge, then an error has occurred, and the error is registered at BER measuring circuit 80. Control logic section 82 counts symbols and provides timing signals to BER measuring circuit 80 and to register (REG) 84. At regular intervals, the accumulated number of errors are transferred to register 84, where they may be read by controller 16 (FIG. 1). Those skilled in the art will appreciate that for reasonably accurate BER measurement results, BER measurer 38 may evaluate many tens of thousands of symbols, and that this evaluation will extend across the boundaries of many bursts 12. Thus, the measured BER provided by BER measurer 38 determines long term BER while the estimated BER provided by BER estimator 36 determines short term BER.

Figure 5:
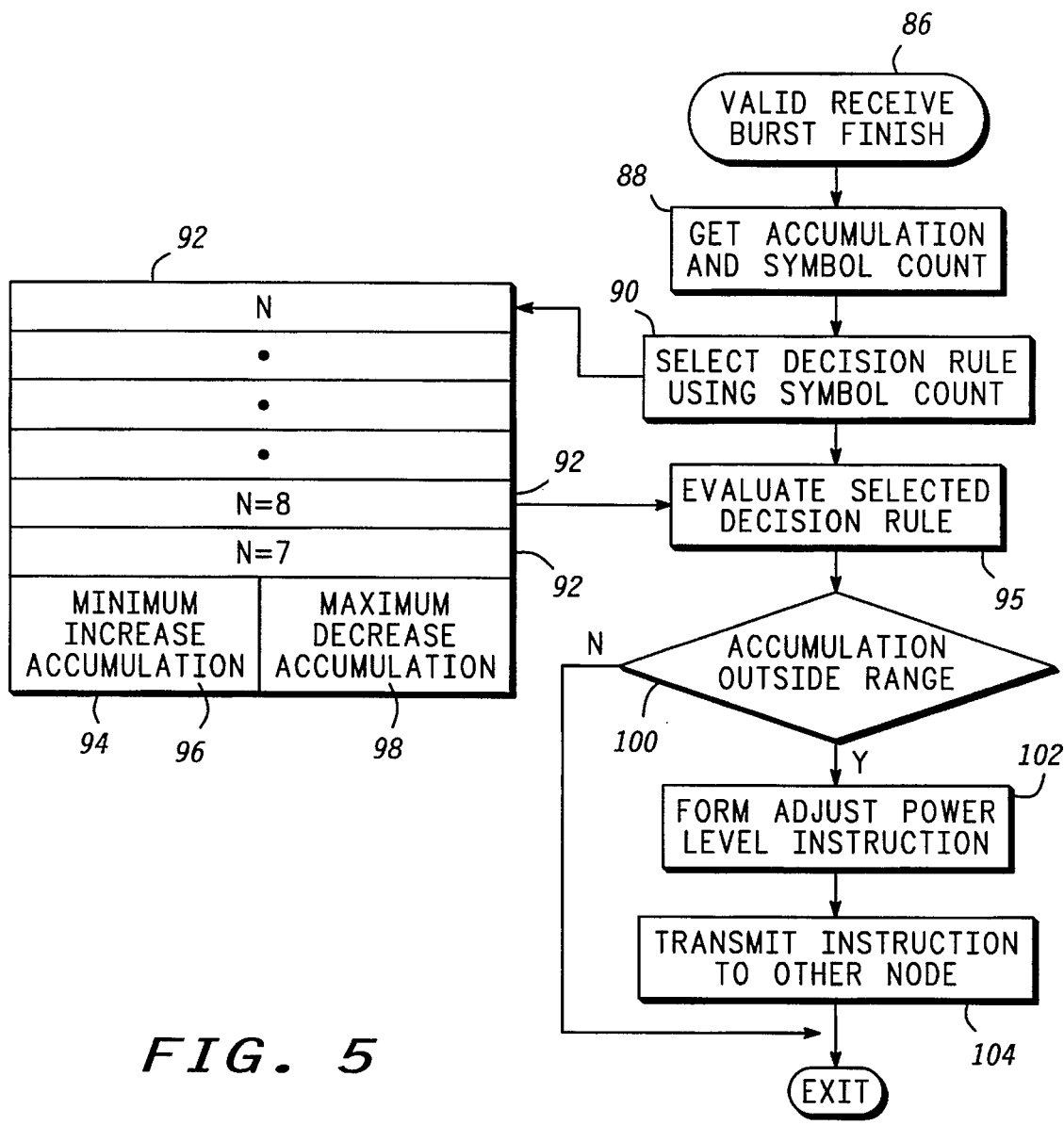
FIG. 5 is a flow chart of a Valid Receive Burst Finished process performed by a controller.

FIG. 5 is a flow chart of Valid Receive Burst Finished process 86 performed by controller 16 (FIG. 1). Process 86 is performed in response to programming instructions stored in memory 18 (FIG. 1). Process 86 is desirably activated once for each valid burst 12. Desirably, process 86 is performed immediately after burst 12 ends, and this event may be detected by monitoring the burst active signal generated by RF section 30 of receiver 22 (FIG. 3). Generally speaking, process 86 evaluates BER estimate and BER estimate accuracy in connection with programmed decision rules to decide whether to instruct transmitter 20 (FIG. 1) to increase or decrease its transmit power level.

Process 86 performs task 88 to get the accumulation value (corresponding to BER estimate) and symbol count value "N" from registers 64, 72 (FIG. 3), respectively. Symbol count value N, where N is an integer number and $2^N$ symbols are integrated to produce the accumulation value, characterizes BER estimate accuracy. Next, task 90 selects decision rule 92 to use in evaluating the BER estimate in response to the BER estimate accuracy, as characterized by symbol count value N. Decision rule 92 represents a particular set of data stored in table 94 in memory 18 (FIG. 1). FIG. 5 depicts table 94 in block diagram form. Table 94 may include any number of decision rules 92. The value N may represent an index into table 94.

After task 90, task 95 evaluates the selected decision rule with the accumulation value obtained above in task 88. As indicated in table 94, each decision rule 92 may include two decision points, referred to as decision points 96, 98. Decision point 96 indicates the minimum accumulation value at which to instruct transmitting node 14 to increase its power level. At this accumulation value (i.e., decision point 96) and all greater accumulation values (reflecting even worse BER estimates), controller 16 will instruct transmitting node 14 to increase its transmit power level, because the signal quality at receiving node 14 is so poor that system 10 (FIG. 1) is beginning to face an intolerable risk of losing data.

Decision point 98 indicates the maximum accumulation value at which to instruct transmitting node 14 to decrease its power level. At this accumulation value and all smaller accumulation values (reflecting even better BER estimates), controller 16 will instruct transmitting node 14 to decrease its transmit power level, because system 10 can operate satisfactorily on poorer quality receive signals, and continued operation at this higher transmit power level unnecessarily risks causing interference or wastes power.

Figure 6:
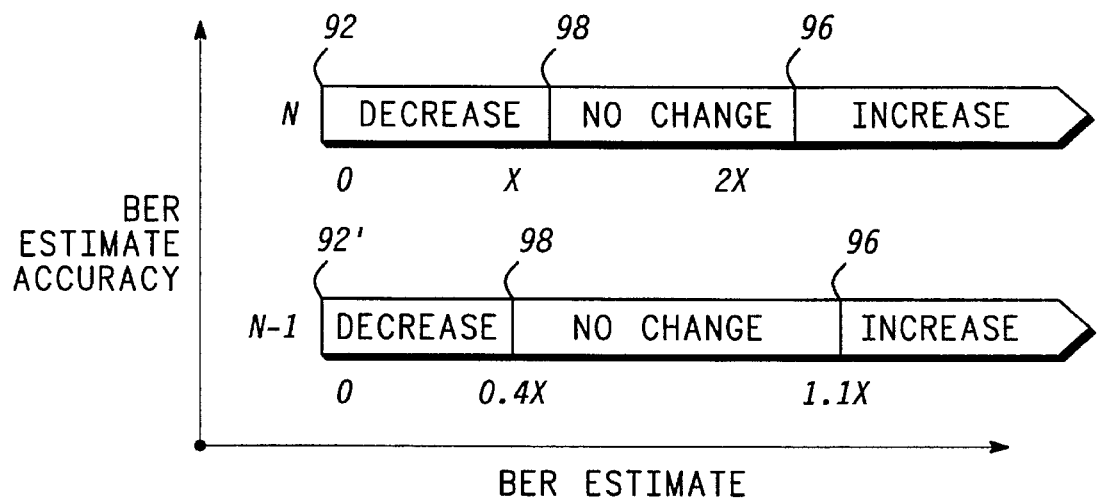
FIG. 6 graphically illustrates diverse decision rules which may be applied in situations where estimated BER parameters exhibit diverse degrees of accuracy.

FIG. 6 graphically illustrates examples of decision rules 92, 92' which may be applied in situations where estimated BER parameters exhibit diverse degrees of accuracy. Decision rule 92 corresponds to a higher BER estimate accuracy N and decision rule 92' corresponds to a lower BER estimate accuracy of N−1. In this example, decision points 98, 96 for decision rule 92 define the maximum decrease point at an accumulation value of X and the minimum increase point at an accumulation value of 2×, respectively, while decision points 98, 96 for decision rule 92' define the maximum decrease point at an accumulation value of 0.4× and the minimum increase point at an accumulation value of 1.1×, respectively.

Decision rules 92, 92' differ in response to two factors, (i) simple scaling or normalization and (ii) accuracy. An actual BER estimate more closely equals the accumulation value divided by time, as may be represented by the number of symbols 28 which were integrated to produce the accumulation value. When integration occurs over $2^{N-1}$ symbols, ½ the accumulation value corresponds to an equivalent BER taken from integration over $2^N$ symbols. In order to simplify implementation, such scaling or normalization is not performed in hardware in receiver 22, but rather this scaling or normalization is compensated for through the programming of table 94 (FIG. 5).

Accuracy also modifies decision rules 92, 92'. If normalization alone were being accounted for in table 94, then decision rule 92' would have decision points 98, 96 at 0.5×, 1.0×, respectively, rather than at 0.4×, 1.1× as shown in FIG. 6. This difference represents decreased accuracy (increased variance) due to the smaller number of samples for decision rule 92'. When BER estimates are less accurate (e.g., when determined from fewer symbols 28), decision rule 92' provides a wider acceptance range. As an example, for a given BER of $2.1×/2^N$, decision rule 92 specifies an increase in transmit power level. But, decision rule 92 is invoked for a more accurate BER estimate. Decision rule 92' is invoked for a less accurate BER estimate. When decision rule 92' faces the same BER of $2.1×/2^N$ which equals $1.05×/2^{N-1}$, it specifies no change in transmit power level. The increase is commanded in the first situation but not the second because receiving node 14 (FIG. 1) is less sure it is receiving a signal 12 of unacceptable quality in the second instance. Receiving node 14 is less sure because the BER estimate is less accurate.

Referring back to FIG. 5, after task 95 evaluates a selected decision rule 92, query task 100 decides whether the accumulation is outside the range defined by decision points 96, 98, i.e., task 100 determines whether the accumulation is less than minimum increase accumulation 96 or greater than maximum decrease accumulation 98. If outside the range defined by the selected decision rule 92, task 102 forms an adjust power level instruction, which may be configured to instruct transmitting node 14 to either increase or decrease its transmit power level, depending upon whether the accumulation is greater or less than the range defined in the selected decision rule 92.

Next, task 104 communicates the instruction by transmitting it to transmitting node 14. After task 104, and when query task 100 determines that the accumulation is within the range defined by the selected decision rule 92, program control exits process 86.

While FIG. 5 illustrates the implementation of decision rules 92 using a particular table memory structure, equivalent techniques may accomplish the same thing, e.g., tasks 90, 95 may be combined to form a single table look-up operation. Alternatively, a generic decision rule may be obtained, then altered to specifically adapt the rule to a given accuracy level, or accumulation data may be altered in response to accuracy data, and then evaluated relative to a generic decision rule.

Figure 7:
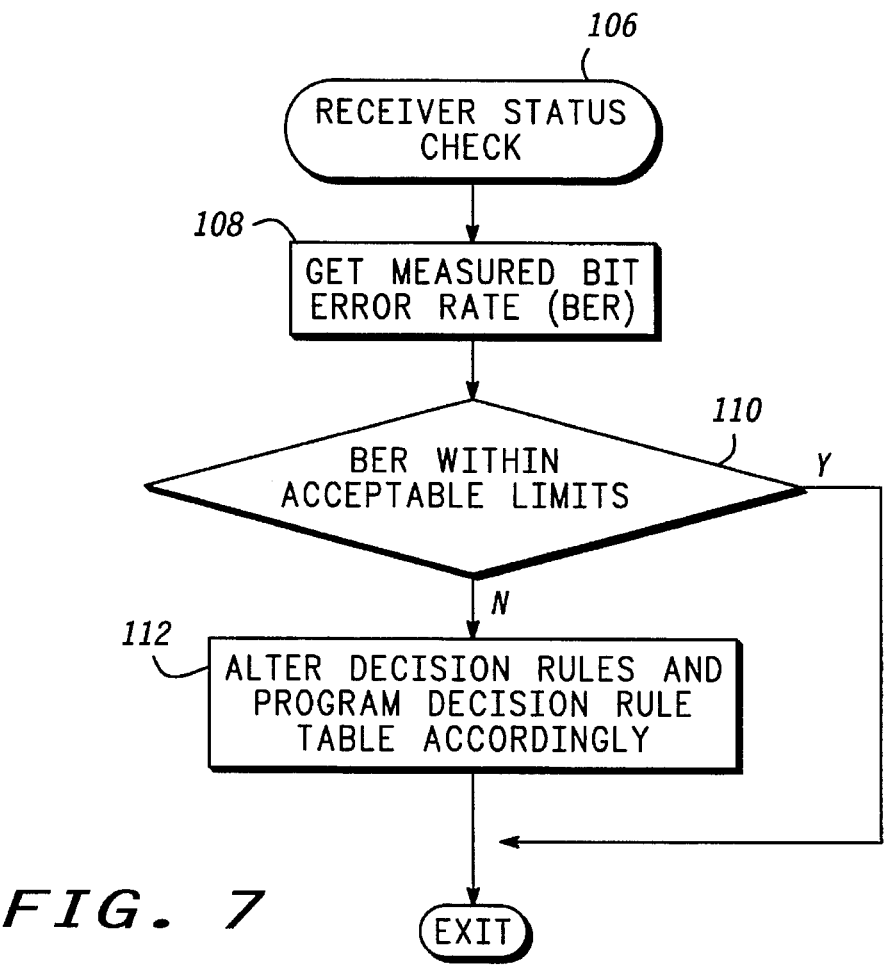
FIG. 7 is a flow chart of a Receiver Status Check process performed by the controller.

FIG. 7 flow charts Receiver Status Check process 106, which may be performed by that node 14 where BER measurer 38 (FIG. 3) makes its measurement. Alternatively, this measurement may be obtained from register 84 (FIG. 3) and transmitted to some other node 14 that may perform process 106. In the preferred embodiment, process 106 is performed at a much slower rate than process 86 (FIG. 5). Generally, process 106 verifies that the evaluation of BER estimates in view of the programmed decision rules 92 (FIGS. 5–6) produces appropriate results.

Process 106 may perform any number of tasks to check various status items irrelevant to the present invention. Process 106 performs task 108 that gets the measured BER, e.g., from register 84 (FIG. 3) of the node 14 where the measurement was made. Next, query task 110 determines whether the actual measured BER is within acceptable limits, which may be predetermined design parameters. If the measured BER is acceptable, then program control exits.

If the measured BER is unacceptable, task 112 alters decision rules 92 (FIGS. 5–6) and programs table 94 (FIG. 5) accordingly to achieve a desired movement in the measured BER. After task 112, program control exits process 106.

Figure 8:
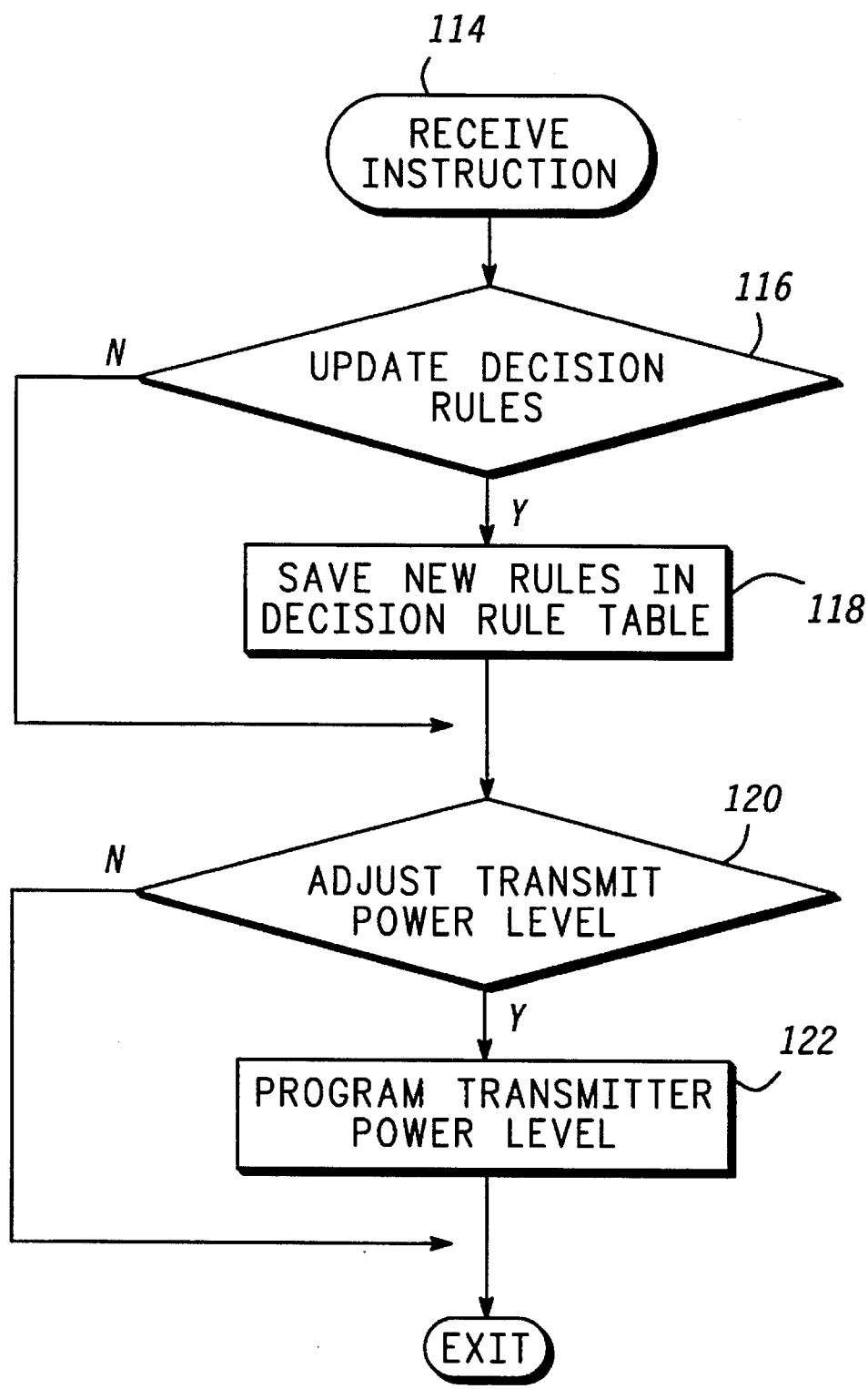
FIG. 8 is a flow chart of a Receive Instruction process performed by the controller.

FIG. 8 flow charts Receive Instruction process 114, which may be performed by any controller 16 of any node 14 and is performed when controller 16 receives an instruction from any source, to parse the instruction and respond.

Process 114 may process any number of instructions not related to the present invention and may also perform query task 116 to determine whether a received instruction was an instruction to update decision rules. Such an instruction may be received when process 106 (FIG. 7) is performed at a node 14 remote to the node 14 whose BER decision rules 92 (FIGS. 5–6) are being verified. When an update decision rules instruction is received, task 118 is performed to save new decision rules accompanying the instruction in decision rule table 94 (FIG. 5).

After task 118 or when task 116 determines that a received instruction is not an update decision rules instruction, query task 120 is performed to determine whether the instruction is an adjust transmit power level instruction. The adjust transmit power level instruction was sent from receiving node 14 as discussed above in connection with task 104 (FIG. 5). When the adjust power level instruction is detected, task 122 is performed to make the indicated adjustment by programming transmitter 20 appropriately. Subsequent bursts 12 will be transmitted at a new power level. Such instructions may occur as often as once for each transmitted burst 12. After task 122 or when task 120 determines that an instruction was not an adjust transmit power level instruction, program control exits process 114.

In summary, the present invention provides an improved system and method for link margin control. The present invention controls transmission power levels in response to a parameter that characterizes the accuracy of a bit error rate estimator. This control may be updated on a burst by burst basis, and the bursts may have different durations. The present invention applies a particular transmission power level control decision rule which is appropriate for the accuracy of the current bit error rate estimator. In addition, the bit error rate is measured to evaluate the appropriateness of transmission power level control decision rules.

The present invention has been described above with reference to preferred embodiments. However, those skilled in the art will recognize that changes and modifications may be made in these preferred embodiments without departing from the scope of the present invention. For example, the particular order and organization of the tasks, processes, and procedures discussed above may be altered without substantially changing the jobs performed. These and other changes and modifications which are obvious to those skilled in the art are intended to be included within the scope of the present invention.

What is claimed is:

1. A method of managing a link margin for a data communication signal transmitted at a power level, said method comprising steps of:

determining a first parameter that corresponds to a bit error rate estimate, by squaring magnitude errors to generate error magnitude values, wherein said magnitude errors comprise differences between a magnitude and a constellation magnitude of one of a set of predetermined constellation points;

detecting a second parameter that measures accuracy of said first parameter; and controlling said power level in response to said first and second parameters.

2. A method as claimed in claim 1 wherein said determining step comprises a step of integrating error magnitude.

3. A method as claimed in claim 2 wherein said detecting step comprises a step of counting that number of symbols over which said error magnitude is integrated.

4. A method as claimed in claim 1 wherein said controlling step comprises a step of evaluating programmable decision rules to decide whether to increase or decrease said power level, said data communication signal conveys error detection codes, and said method additionally comprises steps of:

evaluating said error detection codes to measure bit error rate; and programming said decision rules in response to said measured bit error rate.

5. A method as claim in claim 1 wherein said controlling step increases said power level when said bit error rate estimate exceeds a value that varies in response to accuracy of said bit error rate estimate.

6. A method as claimed in claim 1 wherein said data communication signal is in the form of a data communication burst and said determining and detecting steps are performed approximately once for each burst.

7. A method of managing a link margin for a data communication signal transmitted at a power level, said method comprising steps of:

receiving said data communication signal;

identifying magnitude errors exhibited by said received data communication signal, said magnitude errors comprising differences between a magnitude and a constellation magnitude of one of a set of predetermined constellation points;

determining a value responsive to magnitudes of said magnitude errors over a number of symbols, by squaring said magnitude errors to generate error magnitude values; and deciding, in response to said value and said number of symbols, whether to alter said power level.

8. A method as claimed in claim 7 wherein said determining step comprises steps of:

accumulating said error magnitude values occurring in a predetermined sequence of symbols; and incrementing a counter for each of said symbols in which error magnitude values are accumulated.

9. A method as claimed in claim 8 wherein said determining step additionally comprises steps of:

identifying a transfer time, said transfer time occurring when said counter indicates a value approximately equal to $2^N$ where N is an integer number; and recording, at said transfer time, accumulated error magnitude and a number corresponding to N.

10. A method as claimed in claim 9 wherein said deciding step comprises steps of:

signifying an increase in said power level if said recorded accumulated error magnitude is greater than a threshold; and configuring said threshold so that said threshold divided by $2^N$ varies in response to N.

11. A method as claimed in claim 7 wherein said deciding step comprises a step of signifying an increase in said power level when said value divided by said number of symbols is greater than a decision point, said decision point varying in response to said number of symbols.

12. A method as claimed in claim 7 wherein said deciding step evaluates programmable decision rules, said data communication signal conveys error detection codes, and said method additionally comprises steps of:

evaluating said error detection codes to measure a bit error rate; and programming said decision rules in response to said bit error rate.

13. A method as claimed in claim 7 wherein said data communication signal is in the form of a data communication burst and said deciding step occurs approximately once for each burst.

14. A method as claimed in claim 7 wherein:

said data communication signal is in the form of a data communication burst that conveys a first number of symbols; and said determining and deciding steps are configured so that said number of symbols is less than or equal to said first number of symbols.

15. A method as claimed in claim 7 wherein said deciding step generates an instruction, and said method additionally comprises steps of:

communicating said instruction to a transmission node; and adjusting said power level at said transmission node.

16. A data communication system that maintains a desired link margin, comprising:

a first node having a transmitter configured to transmit a data communication signal at a programmable power level;

a second node having an RF section configured to receive said data communication signal;

a bit error rate estimator, coupled to said RF section, for generating a first parameter that corresponds to an estimate of a bit error rate for said data communication signal;

an accuracy estimator, coupled to said RF section, for generating a second parameter that assesses accuracy of said first parameter; and a controller coupled to said bit error rate estimator and to said accuracy estimator, said controller being configured to program said programmable power level in response to said first and second parameters, wherein said controller is configured to program an increase in said power level when said bit error rate estimate exceeds a decision point that varies in response to the accuracy of said bit error rate estimate.

17. A data communication system as claimed in claim 16 wherein:

said controller comprises means for storing decision rules that define when to adjust said power level;

said decision rules are configured to increase said power level when said estimate of said bit error rate exceeds a first decision point and said second parameter assesses a first accuracy; and said decision rules are configured to increase said power level when said estimate of said bit error rate exceeds a second decision point and said second parameter assesses a second accuracy.

18. A data communication system as claimed in claim 16 wherein said controller is figured to program a decrease in said power level when said bit error rate estimate is less than a decision that varies in response to the accuracy of said bit error rate estimate.

* * * * *